June 7, 1927.

R. H. LANGLEY

DIAL

Filed May 17, 1924

1,631,687

Inventor:
Ralph H. Langley,
by
His Attorney.

Patented June 7, 1927.

1,631,687

UNITED STATES PATENT OFFICE.

RALPH H. LANGLEY, OF SCHENECTADY, NEW YORK, ASSIGNOR TO GENERAL ELECTRIC COMPANY, A CORPORATION OF NEW YORK.

DIAL.

Application filed May 17, 1924. Serial No. 714,185.

My present invention relates to a novel form of dial which is particularly adapted for use on a radio receiving set which is adapted for the reception of music, entertainment, etc., transmitted from radio broadcasting stations.

The object of my invention is to provide a dial which may be readily secured on the front of the panel of a radio receiving set, which is so arranged that the angular positions of a tuning element at which a large number of different stations are received on the set, can be readily noted on the dial in order that the one operating the set may select at will any desired one of a large number of stations.

Figure 1:
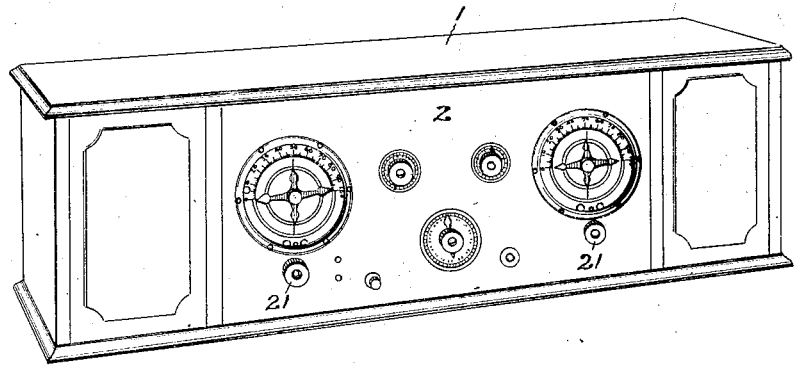
Figure 2:
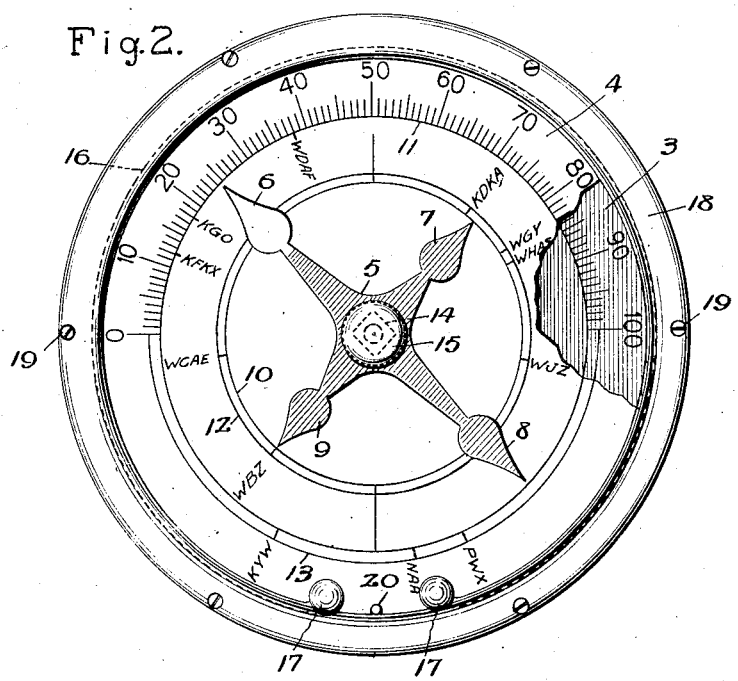

The novel features which I believe to be characteristic of my invention are set forth with particularity in the appended claims; my invention itself, however, both as to its organization and method of operation will best be understood by reference to the following description taken in connection with the accompanying drawing in which Fig. 1 is a perspective of a radio receiving set to which my invention is applied, and Fig. 2 is an enlarged view of the dial illustrating the manner in which it may be employed.

In Fig. 1, I have shown a receiving set of the so-called superheterodyne type in which two tuning elements are employed for selecting different stations. One of these elements is for tuning a receiving loop or antenna to the frequency of the signals to be received, and a second tuning element is provided for the purpose of adjusting the frequency of the oscillations produced by a local oscillator in order that beats of a predetermined frequency may be produced between the received signaling waves and the local oscillations. These tuning elements may consist of variable condensers or inductances. In the type of set illustrated they are preferably condensers so constructed that the variation in capacity from maximum to minimum is obtained by a rotation of 180° of the shaft to which the movable elements of the condenser are secured.

The tuning elements which are within the cabinet 1 of the receiving set indicated in Fig. 1 are mounted on shafts which extend through the panel 2. Each of these shafts is surrounded by a fixed dial 3, which is provided with a suitable scale for indicating by a convenient notation the angular position of the shaft when a particular station is received by the set. In addition to the fixed dial 3, I provide a removable dial 4 which may be paper or any other material upon which the angular positions of the shaft may be readily noted. Each shaft is provided with a pointer 5 having four arms 6, 7, 8 and 9 spaced ninety degrees apart. Opposite arms 6 and 8 of this pointer may be of the same length and opposite arms 7 and 9 may also be of the same length, which is shorter than the length of arms 6 and 8. The dial is marked with a circle 10 having a radius substantially equal to the length of arms 7 and 9 from the center of the shaft and a circle 11 having a radius substantially equal to the length of the arms 6 and 8 from the center of the shaft. The upper one-hundred-and-eighty degrees of the circumference of the circle 11 may be provided with a scale in order that the angular position of the shaft, as indicated by arm 6 of the pointer, may be noted and a record of that position for each station received may be made in a log-book or other form of record to enable the person operating the receiving set to readily determine from such record the angular position of the shaft at which a certain desired station may be received. An additional circle 12 may be provided on the dial of slightly greater diameter than the circle 10, and an additional semi-circle 13 of slightly greater diameter than circle 11 may be provided on the lower portion of the dial, which is not covered by the scale.

When the set is tuned to receive a particular station the angular position of the shaft of the tuning device may be indicated on the dial by a short radial line opposite any one of the four arms of pointer 5. The call letters of the station may also be marked on the dial opposite this radial mark. If both of the dials on the receiving set are marked in this way all that the person operating the receiving set has to do in order to receive a particular desired station is to turn the tuning elements so that one of the arms of the pointer is directed toward the radial mark on the dial which indicates that particular station.

By providing four places on the dial at which the angular position of the tuning element for any particular station may be indicated, it is possible to note on the dial without confusion the position of the tuning element and the call letters for four times as many stations as could be noted thereon if a pointer with a single arm was provided. The pointer 5 is provided with a square opening which fits over a square portion of the end of the shaft as indicated by dotted lines 14. The end of the shaft is provided with screw threads which are engaged by a nut 15, which may readily be turned by hand to permit of the ready removal of the pointer from the shaft, and thus permit of the removal of the dial 4 and the insertion of another dial, as desired. The edge of the dial 4 is held by means of a readily disengageable clamping means comprising a split ring 16 of resilient metal having at its ends knobs 17. This ring when expanded, as indicated in the drawing, is held in place by means of a ring 18, which is secured to the panel by screws 19, and the internal diameter of which is substantially equal to the diameter of the dial 4. When the two knobs 17 are pressed toward each other the ring 16 is contracted so that it may be readily disengaged from the ring 18. When the pointer 5 is removed the dial 4 may be removed. A pin 20 is also provided which projects outwardly from the panel 2 and the dial 4 is provided with a notch 22 at one point in its circumference which registers with this pin 20 in order that when the dial is inserted it may readily be located in a predetermined relation with respect to the shaft.

In the receiving set indicated in the drawing the tuning of the loop or antenna is indicated on the dial at the left of the figure and the tuning of the local oscillator is indicated on the dial at the right of the figure. If desired, the paper dial for the antenna or loop tuning means may be printed with an arbitrary scale and the paper dial for the oscillator tuning means may be printed without any scale. The operator will then when tuning to different broadcasting stations draw a scale on the oscillator dial whose readings will correspond with the printed scale on the other dial when the two circuits are properly tuned to receive the station.

In a superheterodyne receiving set there will be two settings of the oscillator at which any station may be received. If desired, therefore, the operator may indicate on the oscillator dial two different scales, one of which corresponds with the scale on the other dial for one tuning point of the oscillator, and the other of which corresponds with the scale on the first dial for the second tuning point of the oscillator.

In the receiving set shown the shafts to which the tuning elements are connected are provided with means for fine adjustments. The particular means provided for this purpose are not shown in the drawing, but comprise a reduction drive operated by the knobs 21.

While I have shown and described a preferred embodiment of my invention, it will be apparent that many modifications may be made in the manner in which the different elements are constructed, and in the particular markings on the dial itself, without departing from the scope of my invention as set forth in the appended claims.

What I claim as new and desire to secure by Letters Patent of the United States is:—

1. The combination in a wireless apparatus of a shaft adapted to carry a tuning element and adapted to rotate through an angle of one hundred and eighty degrees, a circular dial surrounding said shaft, a pointer on said shaft for indicating the angular position thereof, said pointer having four integral arms spaced ninety degrees apart, two of said arms which are spaced one hundred and eighty degrees apart being shorter than the other two arms and a pair of circles marked on said dial, one of said circles having a radius substantially equal to the length of the shorter arms and the other having a radius substantially equal to the length of the longer arms.

2. The combination in a wireless apparatus of a rotary shaft, a circular dial surrounding said shaft and a pointer on the shaft for indicating the angular position thereof, said pointer having a plurality of arms of different lengths, one half of said dial being provided with spaced scale markings cooperating with one of the arms of said pointer, and means comprising a plurality of circles of different diameter on said dial, cooperating with the arms of said pointer, whereby the angular position of said pointer corresponding to any one of said scale markings may be indicated at more than two points on the dial.

3. The combination in a wireless apparatus of a dial and a shaft adapted to carry a tuning element and to rotate through an angle of 180°, a plurality of circles of different diameter on said dial, and a pointer having four integral arms mounted on said shaft and cooperating with said circles whereby a desired angular position of the shaft may be readily noted by a mark on said dial at any one of four different places thereon, said places being spaced apart 90°.

In witness whereof, I have hereunto set my hand this 16th day of May 1924.

RALPH H. LANGLEY.